United States Patent
Kalyanaraman et al.

(10) Patent No.: US 10,377,859 B2
(45) Date of Patent: Aug. 13, 2019

(54) REACTIVE FRIABLE POLYIMIDE AND METHOD OF MAKING

(71) Applicant: SABIC GLOBAL TECHNOLOGIES B.V., Bergen op Zoom (NL)

(72) Inventors: Viswanathan Kalyanaraman, Newburgh, IN (US); Nitin Vilas Tople, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 101 days.

(21) Appl. No.: 15/541,497

(22) PCT Filed: Jan. 4, 2016

(86) PCT No.: PCT/US2016/012015
§ 371 (c)(1),
(2) Date: Jul. 5, 2017

(87) PCT Pub. No.: WO2016/111911
PCT Pub. Date: Jul. 14, 2016

(65) Prior Publication Data
US 2018/0016395 A1    Jan. 18, 2018

Related U.S. Application Data

(60) Provisional application No. 62/099,625, filed on Jan. 5, 2015.

(51) Int. Cl.
| | |
|---|---|
| *C08G 73/10* | (2006.01) |
| *C08L 33/14* | (2006.01) |
| *C08J 3/12* | (2006.01) |
| *C08L 79/08* | (2006.01) |
| *C08L 63/00* | (2006.01) |

(52) U.S. Cl.
CPC ..... *C08G 73/1053* (2013.01); *C08G 73/1078* (2013.01); *C08J 3/12* (2013.01); *C08L 33/14* (2013.01); *C08L 63/00* (2013.01); *C08L 79/08* (2013.01); *C08J 2379/08* (2013.01)

(58) Field of Classification Search
None
See application file for complete search history.

(56) References Cited

U.S. PATENT DOCUMENTS

| | | |
|---|---|---|
| 4,073,773 A | 2/1978 | Banucci et al. |
| 4,197,396 A * | 4/1980 | Banucci ............. C08G 73/1007 528/125 |
| 4,297,385 A * | 10/1981 | Banucci ................ B05D 7/20 427/120 |
| 4,404,350 A | 9/1983 | Ryang |
| 4,585,852 A | 4/1986 | Lo et al. |
| 4,690,997 A | 9/1987 | Cella et al. |
| 4,808,686 A | 2/1989 | Cella et al. |
| 4,942,007 A | 7/1990 | Kunimoto et al. |
| 6,518,349 B1 | 2/2003 | Felix et al. |
| 6,713,597 B2 | 3/2004 | Lindway |
| 7,015,304 B1 | 3/2006 | Chuang |
| 8,668,981 B2 | 3/2014 | Karst et al. |
| 8,722,187 B2 | 5/2014 | Galluci et al. |
| 9,228,118 B2 | 1/2016 | Hayashi |
| 2003/0181626 A1* | 9/2003 | Lindway ............ C08G 73/1007 528/170 |
| 2005/0080228 A1* | 4/2005 | Silvi ................ C08G 73/1028 528/310 |
| 2014/0135447 A1 | 5/2014 | Golba et al. |

OTHER PUBLICATIONS

Agag et al., "Synthesis and Characterization of Epoxy Film Cured with Reactive Polyimide", Polymer, vol. 40, Issue 23, Nov. 1999, pp. 6557-6563.
Bonnaud et al., "Effect of Reinforcing Glass Fibers on Morphology and Properties of Thermoplastic Modified Epoxy-Aromatic Diamine Matrix", Polymer Composites, vol. 25, No. 4, Aug. 2004, pp. 368-374.
Bonnaud et al., "Use of Reactive Polyetherimide to modify epoxy thermosets. I. Synthesis of an Amino-Grafted Polyetherimide", European Polymer Journal, vol. 40, 2004, pp. 2637-2643.
International Search Report for International Application No. PCT/US2016/012015, International Filing Date Jan. 4, 2016, dated Apr. 15, 2016, 5 pages.
Jianyong Jin et al., "On Polyetherimide Modified Bismaleimide Resins, 1", Macromolecular Chemistry and Physics, vol. 200, 1999, pp. 1956-1960.
Jun Cui et al., "Studies on the Phase Separation of Polyetherimide-modified Epoxy Resin, 1", Macromolecular Chemistry and Physics, vol. 198, Issue 6, Jun. 1997, pp. 1865-1872.
Written Opinion for International Application No. PCT/US2016/012015, International Filing Date Jan. 4, 2016, dated Apr. 15, 2016, 4 pages.
F. Santoso et al. A novel technique for preparation of aminated polyimide membranes with microfiltration characteristics. Journal of Membrane Science, Dated Sep. 4, 2003, p. 171-185.

* cited by examiner

*Primary Examiner* — Christopher M Rodd
(74) *Attorney, Agent, or Firm* — Cantor Colburn LLP

(57) ABSTRACT

Disclosed herein is a friable polyimide powder having a weight average molecular weight, as determined by gel permeation chromatography (GPC) using polystyrene standards, of less than or equal to 24,500 Daltons and a reactive aromatic amine end group concentration greater than or equal to 3 mole percent, wherein 90 weight percent of the powder particles are reducible to less than or equal to 75 micrometers by mechanical grinding. Also disclosed is a method of making the friable polyimide powder, a processed polyimide resulting from the friable polyimide powder and compositions comprising the processed polyimide.

20 Claims, 1 Drawing Sheet

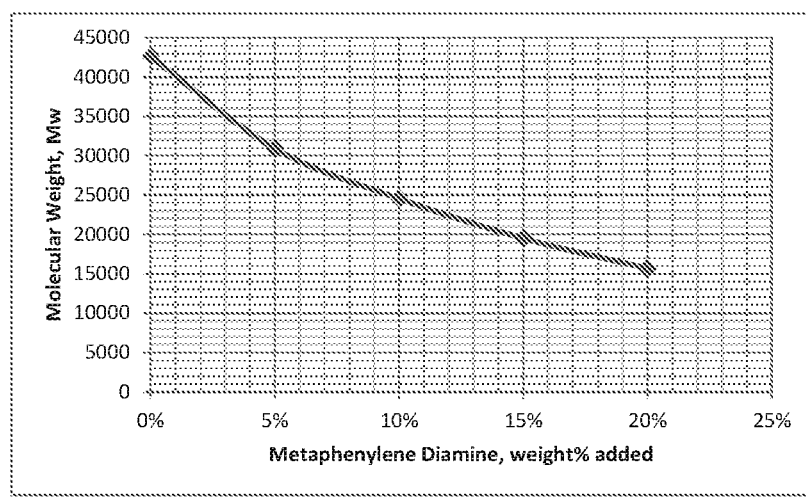

REACTIVE FRIABLE POLYIMIDE AND METHOD OF MAKING

CROSS REFERENCE TO RELATED APPLICATIONS

This application is a National Stage application of PCT/US16/12015, filed Jan. 4, 2016, which claims the benefit of U.S. Provisional Application No. 62/099,625, filed Jan. 5, 2015, both of which are incorporated by reference in their entirety herein.

BACKGROUND

This disclosure relates to the preparation of reactive, friable polyimides. Polyimides, which include polyetherimides, are thermoplastic polymers with a number of desirable properties such as high strength, high toughness, excellent chemical resistance, and high temperature stability due to a high glass transition temperature. They are typically high viscosity materials and the high viscosity combined with the high glass transition temperature can hinder the use of polyimides, particularly polyetherimides, in blends, composites, and coatings.

Polyimides can be added to thermoset composites. Reactive friable polyimide powders are desired to facilitate incorporation into the composite matrix. Reactive friable polyimide powders having molecular weights of about 40,000 to about 80,000 g/mole and a particle size of 100 micrometers or larger are described in U.S. Pat. No. 6,713,597. The higher molecular weights translate to a high viscosity which has a negative impact on incorporation of the polyimide into the matrix. Reduction of particle size is by milling, for example jet milling, which subjects the particles to a pressurized stream of gas and particle size is reduced by interparticle collisions. Accordingly, there is a need in the art for a low molecular weight, highly friable polyimide powders, in particular powders that can be size reduced by simple mechanical grinding.

SUMMARY

The aforementioned need is met by a friable polyimide powder having a weight average molecular weight, as determined by gel permeation chromatography (GPC) using polystyrene standards, of less than or equal to 24,500 Daltons and a reactive aromatic amine end group concentration greater than 3 mole percent, wherein 90 weight percent of the powder particles are reducible to less than or equal to 75 micrometers by mechanical grinding.

The friable polyimide powder can be reduced in size to form a processed polyimide powder. The processed polyimide powder has a reactive group content and weight average molecular weight which are the same as the friable polyimide powder. The maximum particle size for the reactive low molecular weight polyimide powder is less than or equal to 75 micrometers.

A method of making a friable polyimide powder comprises melt blending a first polyimide with greater than 3.0 mole percent of an aromatic diamine to form a melt blend product and cooling the melt blend product to form a friable polyimide powder having 90 weight percent of the particles reducible to a size less than or equal to 75 micrometers by mechanical grinding, wherein the first polyimide has a weight average molecular weight greater than or equal to 30,000 Daltons and the friable polyimide powder has a weight average molecular weight less than or equal to 24,500 Daltons. Weight average molecular weight is determined by gel permeation chromatography (GPC) using polystyrene standards. Mole percent is based on the moles of the dianhydride in the first polyimide polymer.

A processed polyimide powder can be made by a method comprising mechanically grinding and sieving the friable polyimide powder described above, wherein the processed polyimide powder has a maximum particle size less than or equal to 75 micrometers.

The above described and other features are exemplified by the following FIGURES and detailed description.

BRIEF DESCRIPTION OF THE DRAWINGS

The following FIGURES are exemplary embodiments, wherein the like elements are numbered alike.

FIG. 1 is a graph showing the effect of increasing concentration of aromatic diamine and molecular weight after reactive extrusion.

DETAILED DESCRIPTION

Disclosed herein is a method for producing highly friable polyimide powders with reactive end groups. In the method, high molecular weight polyimides are reacted with aromatic diamines under conditions effective to both reduce the molecular weight of the polyimide and increase the mole percent of reactive amine end groups in the polyimide. The friable polyimide powder thus has a novel combination of characteristics—low molecular weight, high reactive amine end group content, and reducibility to small particle size by simple mechanical grinding. In a particularly surprising feature, the friable polyimide powders have low polydispersity indices, on the order of 2.1 to 2.3. This combination of characteristics makes the friable polyimide powder and the processed polyimide powder uniquely useful in combination with thermoset matrices. The small particle size allows for dispersion throughout the thermoset material. The reactive end group content allows for a chemical interaction between the polyimide and the thermoset. The low molecular weight translates to a reduced viscosity which facilitates flow, distribution, and incorporation in the thermoset matrix.

Polyimides as used herein comprise more than 1, for example 10 to 1000, or 10 to 500, structural units of formula (1)

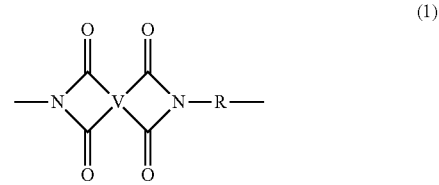

wherein each V is the same or different, and is a substituted or unsubstituted tetravalent $C_{4-40}$ hydrocarbon group, for example a substituted or unsubstituted $C_{6-20}$ aromatic hydrocarbon group, a substituted or unsubstituted, straight or branched chain, saturated or unsaturated $C_{2-20}$ aliphatic group, or a substituted or unsubstituted $C_{4-8}$ cycloalkylene group or a halogenated derivative thereof, in particular a substituted or unsubstituted $C_{6-20}$ aromatic hydrocarbon group. Exemplary aromatic hydrocarbon groups include any of those of the formulas

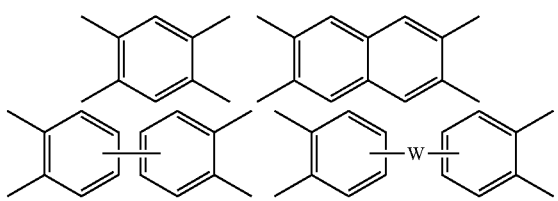

wherein W is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or a group of the formula T as described in formula (3) below.

Further in formula (1), each R is the same or different, and is a substituted or unsubstituted divalent organic group, such as a C$_{6-20}$ aromatic hydrocarbon group or a halogenated derivative thereof, a straight or branched chain C$_{2-20}$ alkylene group or a halogenated derivative thereof, a C$_{3-8}$ cycloalkylene group or halogenated derivative thereof, in particular a divalent group of formulae (2)

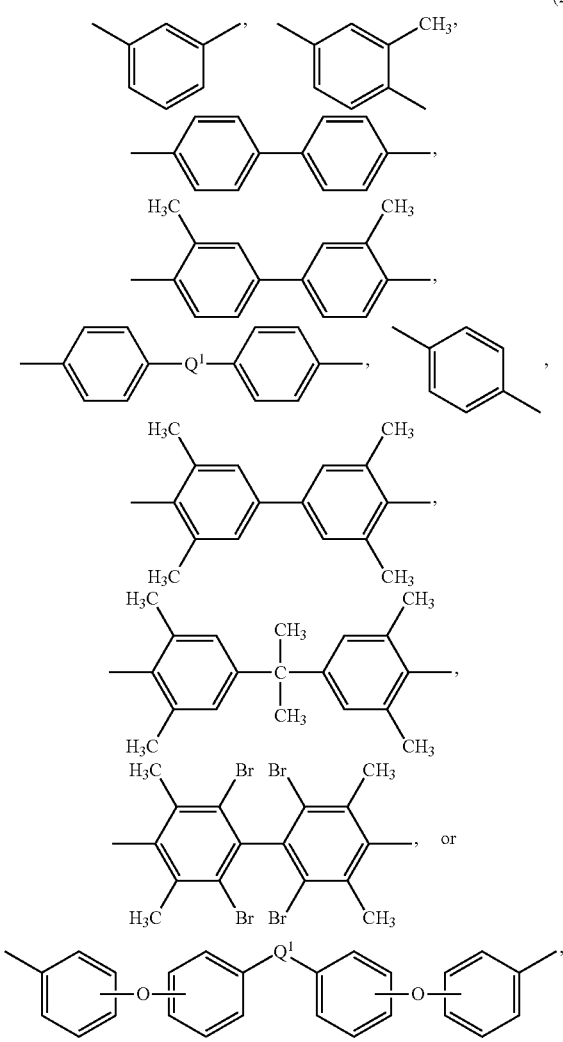

(2)

wherein Q$^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene, p-phenylene, or a diaryl sulfone.

Polyetherimides are a class of polyimides that comprise more than 1, for example 10 to 1000, or 10 to 500, structural units of formula (3)

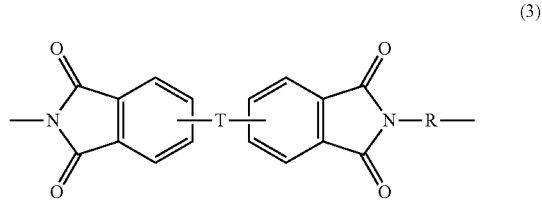

(3)

wherein each R is the same or different, and is as described in formula (3).

Further in formula (3), T is —O— or a group of the formula —O—Z—O— wherein the divalent bonds of the —O— or the —O—Z—O— group are in the 3,3', 3,4', 4,3', or the 4,4' positions. The group Z in —O—Z—O— of formula (1) is also a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded. Exemplary groups Z include groups derived from a dihydroxy compound of formula (4)

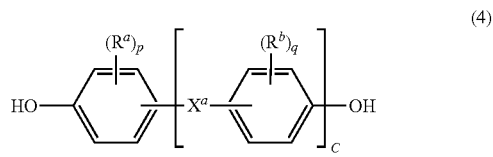

(4)

wherein R$^a$ and R$^b$ can be the same or different and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (4a)

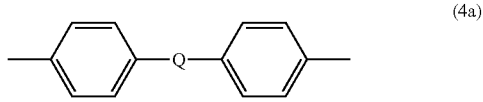

(4a)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (3), R is m-phenylene or p-phenylene and T is —O—Z—O— wherein Z is a divalent group of formula (3a). Alternatively, R is m-phenylene or p-phenylene and T is —O—Z—O wherein Z is a divalent group of formula (3a) and Q is 2,2-isopropylidene.

In some embodiments, the polyimide can be a copolymer, for example, a polyimide sulfone copolymer comprising structural units of formula (1) wherein at least 50 mole % of the R groups are of formula (2) wherein Q$^1$ is —SO$_2$— and the remaining R groups are independently p-phenylene or m-phenylene or a combination comprising at least one of the foregoing; and Z is 2,2'-(4-phenylene)isopropylidene.

Alternatively, the polyimide copolymer optionally comprises additional structural imide units, for example imide units of formula (1) wherein R is as described in formula (1) and T is a linker of the formulas

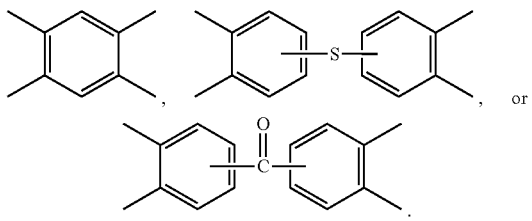

These additional structural imide units can be present in amounts from 0 to 10 mole % of the total number of units, specifically 0 to 5 mole %, more specifically 0 to 2 mole %. In an embodiment no additional imide units are present in the polyetherimide.

The polyimide and polyetherimide can be prepared by any of the methods well known to those skilled in the art, including the reaction of an aromatic bis(ether anhydride) of formula (5a) or formula (5b)

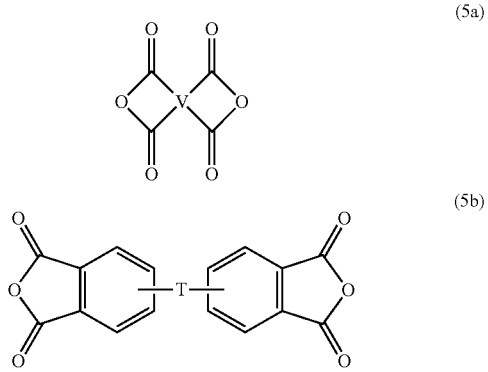

or a chemical equivalent thereof, with an organic diamine of formula (6)

wherein T and R are defined as described above. Copolymers of the polyimides can be manufactured using a combination of an aromatic bis(ether anhydride) of formula (5) and a different bis(anhydride), for example a bis(anhydride) wherein T does not contain an ether functionality, for example T is a sulfone.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; biphenyl tetracarboxylic acid dianhydride, pyromellitic dianhydride, and, 4-(2,3-dicarboxyphenoxy)-4'-(3,4-dicarboxyphenoxy)diphenyl sulfone dianhydride, as well as various combinations thereof.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone, and bis(4-aminophenyl) ether. Combinations of these compounds can also be used. In some embodiments the organic diamine is m-phenylenediamine, p-phenylenediamine, sulfonyl dianiline, or a combination comprising one or more of the foregoing.

The polyimides also include poly(siloxane-imide) copolymers comprising polyimide units of formula (1), preferably of formula (3) and siloxane blocks of formula (7)

wherein each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no bromine or chlorine is present, and in another embodiment no halogens are present. Combinations of the foregoing R groups can be used in the same copolymer. In an embodiment, the polysiloxane blocks comprises R' groups that have minimal hydrocarbon content. In a specific embodiment, an R' group with a minimal hydrocarbon content is a methyl group.

The poly (siloxane-imide)s can be formed by polymerization of an aromatic bisanhydride (4) and a diamine component comprising an organic diamine (6) as described above or mixture of diamines, and a polysiloxane diamine of formula (8)

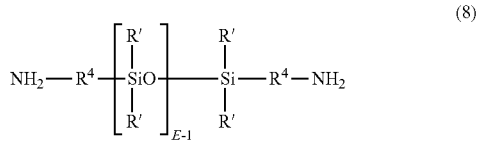

(8)

wherein R' and E are as described in formula (7), and $R^4$ is each independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkylene group, specifically a $C_2$-$C_{10}$ alkylene group such as propylene, and E has an average value of 5 to 100, 5 to 75, 5 to 60, 5 to 15, or 15 to 40. Procedures for making the polysiloxane diamines of formula (8) are well known in the art.

In some poly(siloxane-imide)s the diamine component can contain 10 to 90 mole percent (mol %), or 20 to 50 mol %, or 25 to 40 mol % of polysiloxane diamine (8) and 10 to 90 mol %, or 50 to 80 mol %, or 60 to 75 mol % of diamine (6), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (6) and (8) with aromatic bis(ether anhydrides) (5), to make polyimide blocks that are subsequently reacted together. Thus, the poly(siloxane-imide) copolymer can be a block, random, or graft copolymer. In an embodiment the copolymer is a block copolymer.

Examples of specific poly(siloxane-imide)s are described in U.S. Pat. Nos. 4,404,350, 4,808,686 and 4,690,997. In an embodiment, the poly(siloxane imide) is a poly(siloxane-etherimide) and has units of formula (9)

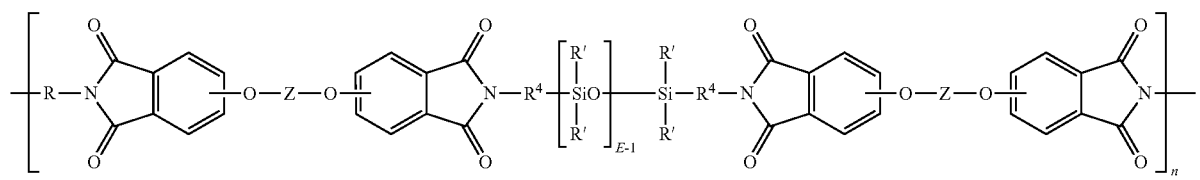

(9)

wherein R' and E of the siloxane are as in formula (5), the R and Z of the imide are as in formula (1), $R^4$ is the same as $R^4$ as in formula (8), and n is an integer from 5 to 100. In a specific embodiment, the R of the etherimide is a phenylene, Z is a residue of bisphenol A, $R^4$ is n-propylene, E is 2 to 50, 5, to 30, or 10 to 40, n is 5 to 100, and each R' of the siloxane is methyl.

The relative amount of polysiloxane units and imide units in the poly(siloxane-imide) depends on the desired properties, and are selected using the guidelines provided herein. In particular, as mentioned above, the block or graft poly (siloxane-imide) copolymer is selected to have a certain average value of E, and is selected and used in amount effective to provide the desired wt % of polysiloxane units in the composition. In an embodiment the poly(siloxane-imide) comprises 10 to 50 wt %, 10 to 40 wt %, or 20 to 35 wt % polysiloxane units, based on the total weight of the poly(siloxane-imide).

The first polyimide, i.e., the polyimide starting material for the process, has a weight average molecular weight (Mw) greater than or equal to 30,000 grams/mole (Dalton), as measured by gel permeation chromatography, using polystyrene standards. In some embodiments the polyimide has an Mw of 30,000 to 80,000 Daltons (grams/mol). After reactive extrusion, the friable polyimide powder have a weight average molecular weight less than or equal to 24,500, or, more specifically, 5,000 to 24,500 Daltons, or, more specifically, 5,000 to 20,000 Daltons, or, more specifically, 5,000 to 16,000 Daltons.

The first polyimide can further optionally have reactive end groups, for example 0 to 30 mole percent, or 1 to 10 mole percent of reactive end groups such as amine, anhydride groups or a combination thereof. The friable polyimide powder has a reactive aromatic amine end group content that is greater than that of the first polyimide. For example, the friable polyimide powder can have a reactive aromatic amine end group content greater than 3 mole percent, more specifically, 3.1 to 40 mole percent. The friable polyimide powder can have a reactive aromatic amine end group content of 3.1 to 30 mole percent. The friable polyimide powder can have a reactive aromatic amine end group content of 3.1 to 20 mole percent. Reactive end group content can be determined by Fourier-transform infrared spectroscopy (FTIR).

The first polyimide can have a polydispersity index (PDI) of 2.05 or higher, for example 2.1 to 5, or 2.1 to 3. The friable polyimide powder and the processed polyimide powder can have a similar PDI, i.e., a PDI within 20%, within 15%, within 10%, within 5%, or within 1% of the PDI of the first polyimide. In an embodiment, the friable polyimide powder has a PDI of 2.1 to 2.5, preferably 2.1 to 2.3, or 2.1 to 2.25.

The friable polyimide powder can be reduced by mechanical grinding. At least ninety weight percent of the friable polyimide powder particles are reducible to a particle size less than or equal to 75 micrometers by mechanical grinding, wherein weight percent is based on the total weight of the friable polyimide powder. This can be determined by mechanically grinding the friable polyimide powder and then sieving the processed polyimide powder with a 75 micrometer sieve and weighing either the fraction that did not pass through the sieve or the fraction that did pass through the sieve and comparing that value to the total weight of the sample. The friable polyimide powder can have at least 90 weight percent of the particle reducible to 1 to 75 micrometers by mechanical grinding. The friable polyimide powder can have at least 90 weight percent of the particle reducible to 10 to 75 micrometers by mechanical grinding. The friable polyimide powder can have at least 90 weight percent of the particles reducible to 25 to 75 micrometers by mechanical grinding.

The aromatic diamine used in the method can be any aromatic diamine stable at melt blending temperatures. Additionally, it is useful if the diamine is not a solid under melt blending conditions. The diamine can be an aromatic diamine of formula (10)

$$H_2N-R^1-NH_2 \quad (10)$$

wherein $R^1$ is a substituted or unsubstituted divalent aromatic group, such as a $C_{6-20}$ aromatic hydrocarbon group or a halogenated derivative thereof, in particular a divalent group of formulae (2) as described above, wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment $R^1$ is m-phenylene, p-phenylene, or a diaryl sulfone.

$R^1$ can be the same as or different from R. In some embodiments R and $R^1$ are different $C_{6-20}$ aromatic hydrocarbon groups. In some embodiments R and $R^1$ are the same $C_{6-20}$ aromatic hydrocarbon group. In a particular embodiment R and $R^1$ are both derived from m-phenylenediamine.

The aromatic diamine is combined with the first polyimide in an amount of 3.1 to 40 mole percent based on the moles of dianhydride in the first polyimide. Within this range the amount of diamine can be 3.1 to 30, or, 3.1 to 20 mole percent, based on the moles of dianhydride in the first polyimide. As shown in the Examples below, higher amounts of the aromatic diamine generally result in lower molecular weights after reactive extrusion.

The first polyimide and the aromatic diamine are melt blended under conditions sufficient to effect a reaction between the aromatic diamine and the first polyimide, in particular to reduce the molecular weight of the first polyimide and to provide additional reactive amine end groups. The first polyimide and aromatic diamine may be mixed prior to adding to the melt blending apparatus. Melt blending can occur in any high viscosity mixing device such as an extruder or a helicone. The aromatic diamine and first polyimide are melt blended for a time sufficient for the aromatic diamine to react with the first polyimide and produce a melt blend product which is cooled to result in a friable polyimide powder having a weight average molecular that is less than the weight average molecular weight of the first polyimide. Exemplary reaction times are 0.5 to 5 minutes. Reactions temperatures can be 250 to 450° C., for example 280 to 380° C. Optionally, vacuum can be used during melt blending.

The friable polyimide powder is further processed to reduce the particle size of the powder and produce a processed polyimide powder. Processing includes grinding, milling, cryo grinding, sieving and combinations thereof. The processed polyimide powder has a weight average molecular weight, PDI and reactive end group content that corresponds to the friable polyimide powder because processing does not affect these properties. The processed powder can be sieved to attain a desired maximum size. In one embodiment the maximum size is 75 micrometers.

The processed polyimide powder can also be melt blended with other polymers to form a polymer blend. Polymers that can be used include polyacetals, poly(meth)acrylates, poly(meth)acrylonitriles, polyamides, polycarbonates, polydienes, polyesters, polyethers, polyetheretherketones, polyetherimides, polyethersulfones, polyfluorocarbons, polyfluorochlorocarbons, polyimides, poly(phenylene ether), polyketones, polyolefins, polyoxazoles, polyphosphazenes, polysiloxanes, polystyrenes, polysulfones, polyurethanes, polyvinyl acetates, polyvinyl chlorides, polyvinylidene chlorides, polyvinyl esters, polyvinyl ethers, polyvinyl ketones, polyvinyl pyridines, polyvinyl pyrrolidones, and copolymers thereof, for example polyetherimide siloxanes, ethylene vinyl acetates, and acrylonitrile-butadiene-styrene.

The processed polyimide powder can also be incorporated into a curable composition. The curable composition comprises the processed polyimide powder and a thermosetting component. The thermosetting component can comprise epoxy components, phenol/formaldehyde components, bismaleimide components, cyanoacrylate components, polyurethane prepolymers, and combinations thereof. More specifically the thermosetting component can comprise epoxy component, bismaleimide component, cyanoacrylate component, or a combination thereof. The epoxy component may be selected from epoxy compounds having a broad range of structures and molecular weights as long as it contains at least two glycidyl groups per molecule. Exemplary epoxy components include aliphatic, cycloaliphatic and aromatic epoxy compounds, as well as combinations of the foregoing. Exemplary cycloaliphatic epoxy compounds include vinylcyclohexane dioxide, 4(1,2 epoxy ethyl) 1,2 epoxy cyclohexane, 3,4 epoxy cyclohexylmethyl (3,4 epoxy) cyclohexane carboxylate, and 2-(3,4 epoxy) cyclohexyl-5,5 spiro(3,4-epoxy)-cyclohexane-m-dioxane. Exemplary aromatic epoxy compounds include: resorcinol diglycidyl ether (or 1,3-bis(2,3-epoxy propoxy)benzene); diglycidyl ether of bisphenol A (or 2,2-bis(4-(2,2-bis(4-(2,3-epoxypropoxy)3-bromophenyl) propane); diglycidyl ether of bisphenol F; triglycidyl p-aminophenol (or 4-(2,3-epoxypropoxy)-N,N-bis(2,3-epoxypropyl)aniline); diglycidyl ether of bromobisphenol A (or 2,2-bis(4-(2,2-bis(4-(2,3-epoxypropoxy)3-bromophenyl) propane); diglycidyl ether of bisphenol F (or 2,2-bis(p-(2,3-epoxypropoxy-phenyl) methane); triglycidyl ether of meta-aminophenol (or 3-(2,3-epoxypropoxy)-N,-N-bis12,3-epoxypropyl)aniline); tetraglycidyl methylene diaminodiphenyl methane); N,N,N', N'-tetraglycidyl-4,4'-bisbenzenamine; and low viscosity epoxy novolac resins. The curable composition may further comprise a curing agent. Exemplary curing agents include phenolic resins, acid anhydrides, amines and imidazoles. The curable composition is typically heated to effect curing and result in a thermoset composite.

The invention is further demonstrated by the following non-limiting examples.

EXAMPLES

A polyetherimide wherein R is derived from meta-phenylene diamine and T is derived from bisphenol A was used as a starting material. The polyetherimide had a weight average molecular weight of 42,631 grams per mole as determined by GPC using polystyrene standards. The starting polyetherimide was ground to a powder with 350 micrometer mean particle size. The diamine, m-phenylenediamine, was ground into fine powder using mechanical grinder.

The polyetherimide powder starting material (the first polyetherimide) and m-phenylenediamine powder were dry mixed in different ratios. The powder mixes were fed to an 18 millimeter (mm), 12 barrel twin screw extruder. The temperature profile of the extruder was as follows:

| Barrel 1 | Feed | 55° C. |
|---|---|---|
| Barrel 2 | Conveying | 75° C. |
| Barrel 3-4 | Conveying | 200° C. |
| Barrel 5-6 | Mixing | 330° C. |
| Barrel 6-12 | Mixing + Conveying | 350° C. |

Barrels 8 and 11 had an atmospheric vent that was connected to a knock-out pot and condenser set-up. The feed rate was 2 kilograms per hour (kg/hr) and extruder screws rotated at 250 RPM.

The melt blend product exiting out of the extruder was air cooled to produce the friable polyimide powder. The friable polyimide was ground in a mechanical grinder and sieved via 75 micrometer sieve.

Molecular weight of the polymers was determined using GPC with polystyrene standards.

The stoichiometric analysis of excess amine or excess anhydride was determined via FT-IR. This is reported in mol % and includes both mono-functional monomer (where the other end is part of the polymer film) as well as di-functional monomer.

Table 1 illustrates the reactive extrusion results of the starting polyetherimide mixed with m-phenylenediamine (MPD) to produce the friable polyetherimide powder.

TABLE 1

| | Added MPD, mole % | Mw, Daltons | Mn, Daltons | PDI | MZ/Mw | Stoich, amine mol % | Stoich, anhydride mol % |
|---|---|---|---|---|---|---|---|
| 1 | 0% | 42631 | 19981 | 2.13 | 1.498 | 0 | 0.15 |
| 2 | 5% | 30904 | 14354 | 2.15 | 1.519 | 1.29 | 0 |
| 3 | 10% | 24563 | 11210 | 2.19 | 1.544 | 6.87 | 0 |
| 4 | 15% | 19504 | 8834 | 2.2 | 1.575 | 10.96 | 0 |
| 5 | 20% | 15678 | 7008 | 2.23 | 1.639 | 14.69 | 0 |

As shown in Table 1 and FIG. 1, reactive extrusion of the first polyimide with m-phenylenediamine reduced the molecular weight of the polymer and increased the amine end group percentage of the final polyimide. In a surprising and advantageous feature, the polydispersity index (PDI) of the final polymer is <2.25 even when the molecular weight of the final polymer is as low as 15,678. Table 2 illustrates the friability of the polyimide produced via reactive extrusion. The polyimide produced by reactive extrusion was mechanically ground using lab grinder. If 90 weight percent of the ground powder passed through a 75 micrometer sieve, it was considered to be friable.

TABLE 2

| | Mw | Friable to <75 micrometers |
|---|---|---|
| 1 | 42631 | NO |
| 2 | 30904 | NO |
| 3 | 24563 | NO |
| 4 | 19504 | YES |
| 5 | 15678 | YES |

The polyimide produced via reactive extrusion with a weight average molecular weight below 24,500 Daltons shows excellent friability and these polymers can be ground below 75 micrometers using a mechanical grinding process.

The above examples demonstrate it is possible to produce a friable polyimide powder having reactive end groups by melt blending a diamine with a polyimide. In order for the polyimide to be friable the molecular weight needs to be less than or equal to 20,000 g/mol. The friable polyimide has a low polydispersity index.

Embodiment 1

A friable polyimide powder having a weight average molecular weight, as determined by gel permeation chromatography using polystyrene standards, of less than or equal to 24,500 Daltons, and a reactive aromatic amine end group concentration greater than 3 mole percent, wherein 90 weight percent of the powder particles are reducible to less than or equal to 75 micrometers by mechanical grinding.

Embodiment 2

The friable polyimide powder of Embodiment 1, having a weight average molecular weight of 5,000 to 24,500 Daltons.

Embodiment 3

The friable polyimide powder of Embodiment 1, having a weight average molecular weight of 5,000 to 20,000 Daltons.

Embodiment 4

The friable polyimide powder of Embodiment 1, having a weight average molecular weight of 5,000 to 16,000 Daltons.

Embodiment 5

The friable polyimide powder of any one or more of Embodiments 1 to 4, having a reactive aromatic amine end group concentration of 3.1 to 40 mole percent.

Embodiment 6

The friable polyimide powder of any one or more of Embodiments 1 to 4, having a reactive aromatic amine end group concentration of 3.1 to 30 mole percent.

Embodiment 7

The friable polyimide powder of any one or more of Embodiments 1 to 4, having a reactive aromatic amine end group concentration of 3.1 to 20 mole percent.

Embodiment 8

The friable polyimide powder of any one or more of Embodiments 1 to 7, wherein 90 weight percent of the particles are reducible to 1 to 75 micrometers.

Embodiment 9

The friable polyimide powder of any one or more of Embodiments 1 to 7, wherein 90 weight percent of the particles are reducible to 10 to 75 micrometers.

Embodiment 10

The friable polyimide powder of any one or more of Embodiments 1 to 7, wherein 90 weight percent of the particles are reducible to 25 to 75 micrometers by mechanical grinding.

Embodiment 11

The friable polyimide powder of any one or more of Embodiments 1 to 10, wherein the polyimide is a polyetherimide that comprises units of the formula

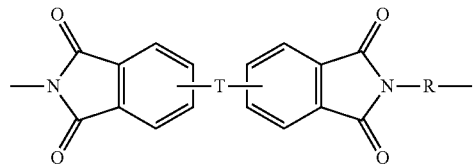

wherein
R is a $C_{2-20}$ hydrocarbon group,
T is —O— or a group of the formula —O—Z—O— wherein the divalent bonds of the —O— or the —O—Z—O— group are in the 3,3', 3,4', 4,3', or the 4,4' positions, and
Z is an aromatic $C_{6-24}$ monocyclic or polycyclic group optionally substituted with 1 to 6 $C_{1-8}$ alkyl groups, 1-8 halogen atoms, or a combination comprising at least one of the foregoing.

Embodiment 12

The friable polyimide powder of Embodiment 11, wherein R is a divalent group of the formula

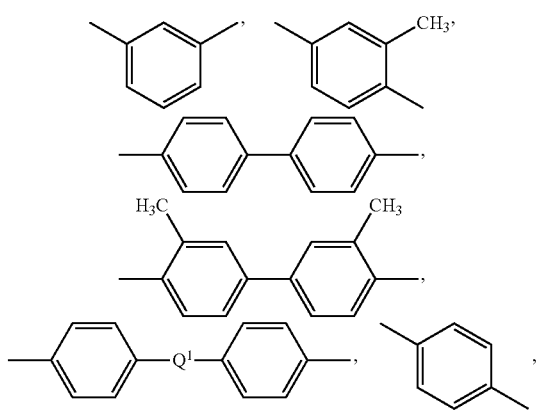

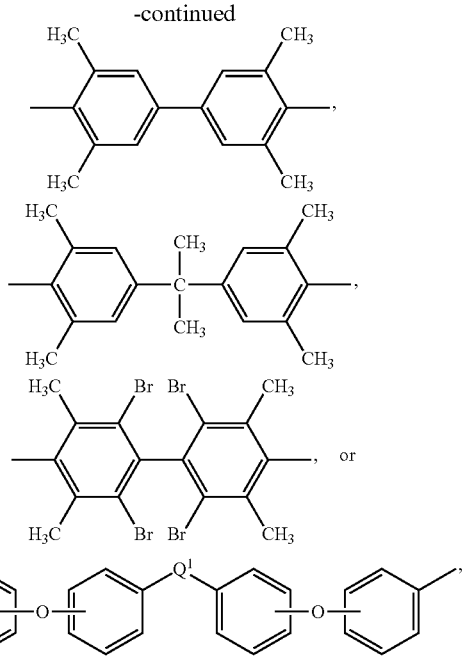

wherein
$Q^1$ is —O—, —S—, —C(O)—, —$SO_2$—, —SO—, —$C_yH_{2y}$— and a halogenated derivative thereof wherein y is an integer from 1 to 5, or —$(C_6H_{10})_z$— wherein z is an integer from 1 to 4; and Z is a group derived from a dihydroxy compound of the formula

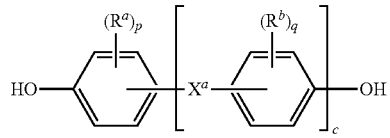

wherein
$R^a$ and $R^b$ are each independently a halogen atom or a monovalent $C_{1-6}$ alkyl group;
p and q are each independently integers of 0 to 4;
c is 0 to 4; and
$X^a$ is a single bond, —O—, —S—, —S(O)—, —$SO_2$—, —C(O)—, or a $C_{1-18}$ organic bridging group.

Embodiment 13

The friable polyimide powder of Embodiment 12, wherein each R is independently meta-phenylene, para-phenylene, 4,4'-diphenylene sulfone, a combination comprising at least one of the foregoing, and Z is 4,4'-diphenylene isopropylidene.

Embodiment 14

The friable polyimide powder of Embodiment 11 wherein the polyimide powder is a polyetherimide comprising structural units of the formula

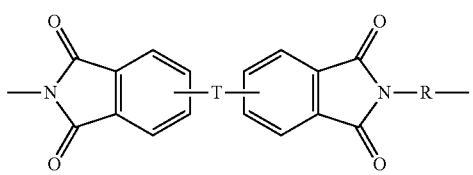

wherein T is a group of the formula —O—Z—O— and derived from bisphenol A and R is m-phenylene.

Embodiment 15

The friable polyimide powder of any one or more of Embodiments 1 to 10, wherein the polyimide comprises units of the formula

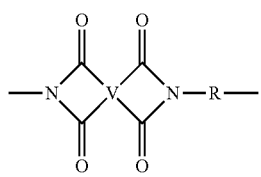

wherein each R is a $C_{2-20}$ hydrocarbon group and V is an unsubstituted $C_6$ aromatic hydrocarbon group.

Embodiment 16

The friable polyimide powder of any one or more of claims 1 to 10, wherein the polyimide comprises units of the formula

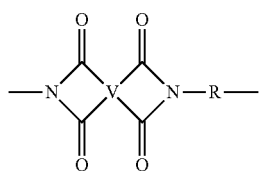

wherein each R is a $C_{2-20}$ hydrocarbon group and V is a benzophenone, biphenyl, $C_6$ aromatic hydrocarbon group, or a combination thereof.

Embodiment 17

A method of making a processed polyimide powder comprising mechanically grinding the friable polyimide powder of any one of Embodiments 1 to 15, sieving the product of grinding with a 75 micrometer sieve, and collecting the particles that pass through the sieve.

Embodiment 18

A processed polyimide powder produced by the method of Embodiment 17 having a weight average molecular weight, as determined by gel permeation chromatography using polystyrene standards, of less than or equal to 24,500 Daltons, and a reactive aromatic amine end group concentration greater than 3 mole percent, and a maximum particle size less than or equal to 75 micrometers.

Embodiment 19

A curable composition comprising the processed polyimide powder of Embodiment 18 and a thermosetting component.

Embodiment 20

The curable composition of Embodiment 19, wherein the thermosetting component comprises an epoxy component, bismaleimide component, cyanoacrylate component, or a combination thereof.

Embodiment 21

A method of making a friable polyimide powder comprising: melt blending a first polyimide having a weight average molecular weight greater than or equal to 30,000 Daltons with greater than 3 mole percent of an aromatic diamine under conditions effective to form a friable polyimide powder; wherein the friable polyimide powder has a weight average molecular weight less than or equal to 24,500 Daltons, an aromatic amine reactive end group concentration greater than 3 mole percent, and wherein 90 weight percent of the powder particles are reducible to less than or equal to 75 micrometers by mechanical grinding wherein the weight average molecular weight is determined by gel permeation chromatography using polystyrene standards, and mole percent is based on the moles of the dianhydride in the first polyimide polymer.

Embodiment 22

The method of Embodiment 21, wherein the first polyimide has a weight average molecular weight of 30,000 to 100,000 Daltons Embodiment 23

The method of Embodiment 21, wherein the first polyimide has a weight average molecular weight of 30,000 to 80,000 Daltons.

Embodiment 24

The method of any one of Embodiments 21 to 23, wherein the aromatic diamine is added to first polyimide in molten form.

Embodiment 25

The method of any one or more of Embodiments 21 to 24, wherein the diamine is of the formula $H_2N—R^1—NH_2$ wherein $R^1$ is a divalent group of the formula

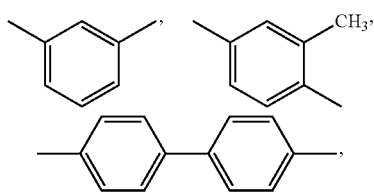

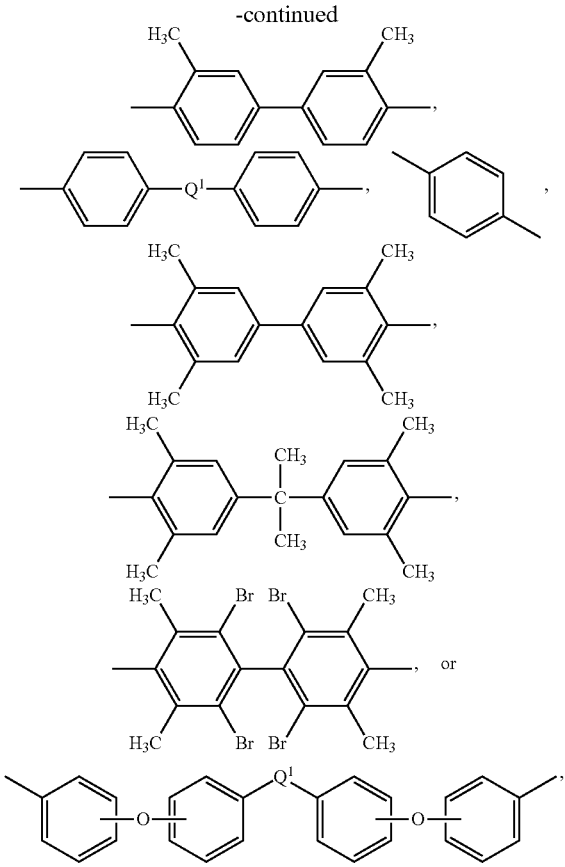

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4

Embodiment 26

The method of any one or more of Embodiments 21 to 24, wherein the diamine comprises m-phenylenediamine.

In general, the invention may alternatively comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. Reference throughout the specification to "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—CH$_2$—) or propylene (—(CH$_2$)$_3$—)). "Alkenyl" and "alkenylene" mean a monovalent or divalent, respectively, straight or branched chain hydrocarbon group having at least one carbon-carbon double bond (e.g., ethenyl (—HC=CH$_2$) or propenylene (—HC(CH$_3$)=CH$_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —C$_n$H$_{2n-x}$ and —C$_n$H$_{2n-2x}$— wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), C$_{1-6}$ alkyl, C$_{2-6}$ alkenyl, C$_{2-6}$ alkynyl, C$_{1-6}$ haloalkyl, C$_{1-9}$ alkoxy, C$_{1-6}$ haloalkoxy, C$_{3-12}$ cycloalkyl, C$_{5-18}$ cycloalkenyl, C$_{6-12}$ aryl, C$_{7-13}$ arylalkylene (e.g, benzyl), C$_{7-12}$ alkylarylene (e.g, toluyl), C$_{4-12}$ heterocycloalkyl, C$_{3-12}$ heteroaryl, C$_{2-6}$ alkanoyl (e.g., acyl (H$_3$CC(=O)—); carboxamido, C$_{1-6}$ alkyl sulfonyl (—S(=O)$_2$-alkyl), C$_{6-12}$ arylsulfonyl (—S(=O)$_2$-aryl), or tosyl (CH$_3$C$_6$H$_4$SO$_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A friable polyimide powder having
   a weight average molecular weight, as determined by gel permeation chromatography using polystyrene standards, of less than or equal to 24,500 Daltons, and
   a reactive aromatic amine end group concentration greater than 3 mole percent,
   wherein 90 weight percent of the powder particles are reducible to less than or equal to 75 micrometers by mechanical grinding.

2. The friable polyimide powder of claim 1, having a weight average molecular weight of 5,000 to 24,500 Daltons.

3. The friable polyimide powder of claim 1, having a reactive aromatic amine end group concentration of 3.1 to 40 mole percent.

4. The friable polyimide powder of claim 1, wherein 90 weight percent of the particles are reducible to 1 to 75 micrometers.

5. The friable polyimide powder of claim 1, wherein 90 weight percent of the particles are reducible to 25 to 75 micrometers by mechanical grinding.

6. The friable polyimide powder of claim 1, wherein the polyimide is a polyetherimide that comprises units of the formula

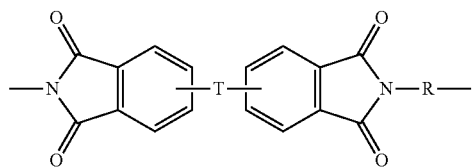

wherein
R is a $C_{2-20}$ hydrocarbon group,
T is —O— or a group of the formula —O—Z—O— wherein the divalent bonds of the —O— or the —O—Z—O— group are in the 3,3', 3,4', 4,3', or the 4,4' positions, and
Z is an aromatic $C_{6-24}$ monocyclic or polycyclic group optionally substituted with 1 to 6 $C_{1-8}$ alkyl groups, 1-8 halogen atoms, or a combination comprising at least one of the foregoing.

7. The friable polyimide powder of claim 6, wherein R is a divalent group of the formula

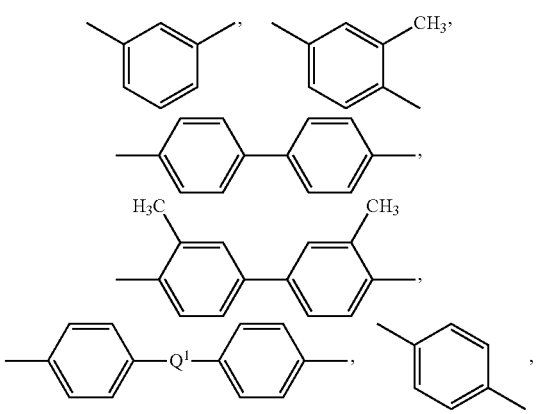

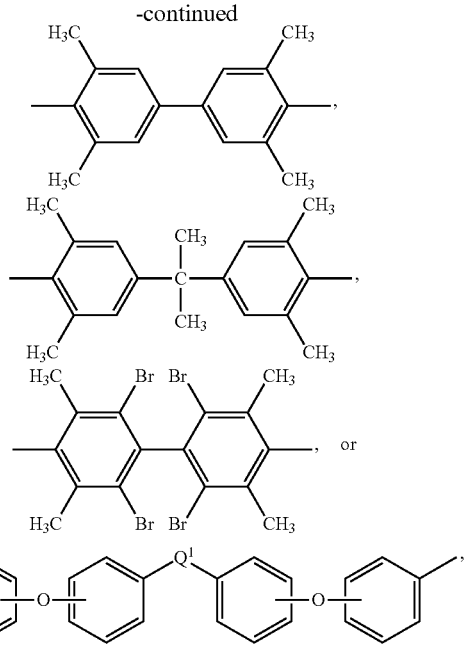

wherein
$Q^1$ is —O—, —S—, —C(O)—, —SO$_2$—, —SO—, —C$_y$H$_{2y}$— and a halogenated derivative thereof wherein y is an integer from 1 to 5, or —(C$_6$H$_{10}$)$_z$— wherein z is an integer from 1 to 4; and Z is a group derived from a dihydroxy compound of the formula

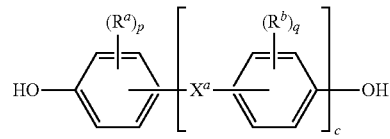

wherein
$R^a$ and $R^b$ are each independently a halogen atom or a monovalent $C_{1-6}$ alkyl group;
p and q are each independently integers of 0 to 4;
c is 0 to 4; and
$X^a$ is a single bond, —O—, —S—, —S(O)—, —SO$_2$—, —C(O)—, or a $C_{1-18}$ organic bridging group.

8. The friable polyimide powder of claim 7, wherein each R is independently meta-phenylene, para-phenylene, 4,4'-diphenylene sulfone, a combination comprising at least one of the foregoing, and Z is 4,4'-diphenylene isopropylidene.

9. The friable polyimide powder of claim 6 wherein the polyimide powder is a polyetherimide comprising structural units of the formula

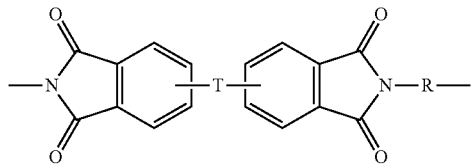

wherein T is a group of the formula —O—Z—O— and derived from bisphenol A and R is m-phenylene.

10. The friable polyimide powder of claim 1, wherein the polyimide comprises units of the formula

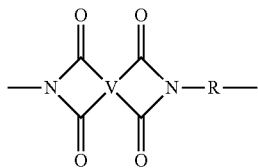

wherein each R is derived from R is a $C_{2-20}$ hydrocarbon group and V is an unsubstituted $C_6$ aromatic hydrocarbon group.

11. The friable polyimide powder of claim 1, wherein the polyimide comprises units of the formula

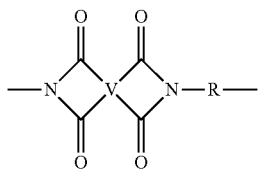

wherein V is benzophenone, biphenyl, $C_6$ aromatic hydrocarbon group, or a combination thereof.

12. A method of making a processed polyimide powder comprising mechanically grinding the friable polyimide powder of claim 1, sieving the product of grinding with a 75 micrometer sieve, and collecting the particles that pass through the sieve.

13. A processed polyimide powder produced by the method of claim 12 having
 a weight average molecular weight, as determined by gel permeation chromatography using polystyrene standards, of less than or equal to 24,500 Daltons, and
 a reactive aromatic amine end group concentration greater than 3 mole percent, and
 a maximum particle size less than or equal to 75 micrometers.

14. A curable composition comprising the processed polyimide powder of claim 13 and a thermosetting component.

15. The curable composition of claim 14, wherein the thermosetting component comprises an epoxy component, bismaleimide component, cyanoacrylate component, or a combination thereof.

16. A method of making a friable polyimide powder comprising melt blending
 a first polyimide having a weight average molecular weight greater than or equal to 30,000 Daltons with greater than 3 mole percent of an aromatic diamine under conditions effective to form a friable polyimide powder;
  having a weight average molecular weight less than or equal to 24,500 Daltons,
  an aromatic amine reactive end group concentration greater than 3 mole percent, and
 wherein 90 weight percent of the powder particles are reducible to less than or equal to 75 micrometers by mechanical grinding wherein the weight average molecular weight is determined by gel permeation chromatography using polystyrene standards, and mole percent is based on the moles of the dianhydride in the first polyimide polymer.

17. The method of claim 16, wherein the first polyimide has a weight average molecular weight of 30,000 to 80,000 Daltons.

18. The method of any one of claim 16, wherein the aromatic diamine is added to first polyimide in molten form.

19. The method of claim 16, wherein the diamine is of the formula $H_2N-R^1-NH_2$ wherein $R^1$ is a divalent group of the formula

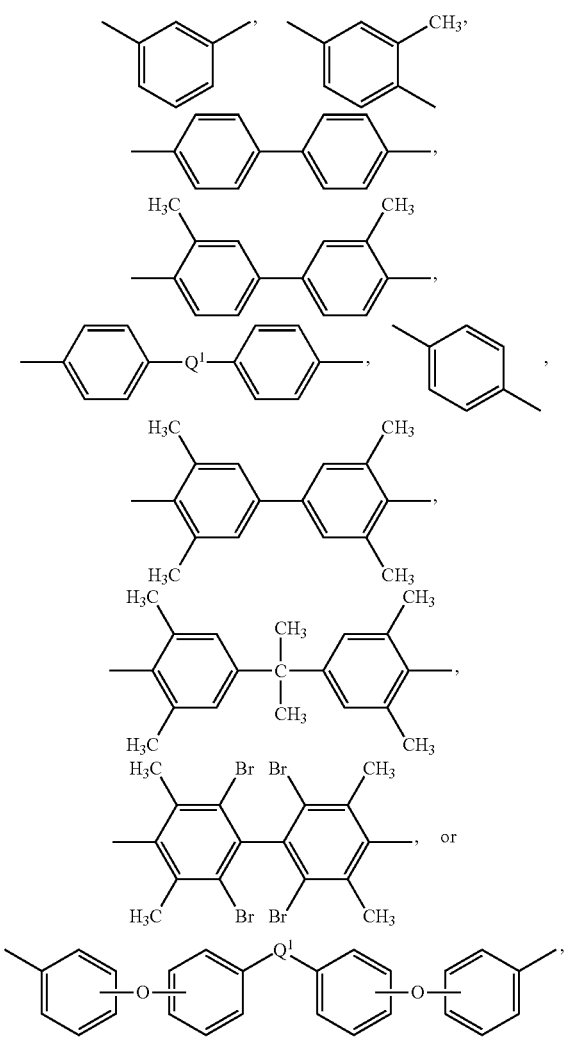

wherein $Q^1$ is —O—, —S—, —C(O)—, —SO$_2$—, —SO—, —$C_yH_{2y}$— wherein y is an integer from 1 to 5 or a halogenated derivative thereof (which includes perfluoroalkylene groups), or —$(C_6H_{10})_z$— wherein z is an integer from 1 to 4.

20. The method of claim 16, wherein the diamine comprises m-phenylenediamine.

* * * * *